Figure 1:
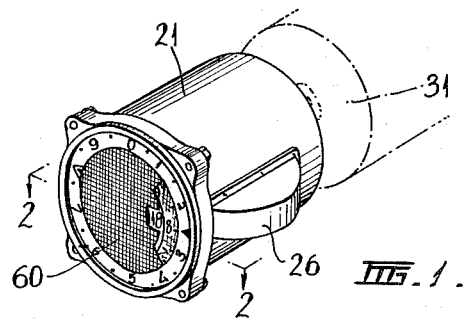

Aug. 24, 1965    R. W. CUMMING ETAL    3,202,128
DIGITAL INDICATING DEVICE

Filed Sept. 3, 1963    2 Sheets-Sheet 1

Aug. 24, 1965        R. W. CUMMING ETAL        3,202,128
                    DIGITAL INDICATING DEVICE
Filed Sept. 3, 1963                          2 Sheets-Sheet 2

United States Patent Office 3,202,128
Patented Aug. 24, 1965

3,202,128
DIGITAL INDICATING DEVICE
Ronald William Cumming, Brighton, Victoria, and John Russell Baxter, Chadstone, Victoria, Australia, assignors to Commonwealth of Australia, Canberra, New South Wales, Australia
Filed Sept. 3, 1963, Ser. No. 306,195
Claims priority, application Australia, Sept. 10, 1962, 21,946
8 Claims. (Cl. 116—129)

This invention relates to improvements in and connected with meters and is concerned more particularly with meters from which information is obtained visually. Although it is not necessarily restricted thereto the invention has particular application to an aircraft altimeter.

The standard aircraft altimeter having a fixed dial with a three pointer arrangement can easily be misread, particularly in a crisis, and the incidence of misreading of this instrument is very high even with experienced air-line pilots. Because of this, various attempts have been made in the past to produce altimeters which present altitude information in digital form, with the aim of reducing reading errors. One instrument which has been developed is the drum pointer altimeter which is a drum marked with thousands of feet and arranged to rotate about a horizontal axis. The drum is viewed through a window with a horizontal lubber line across it, and a single pointer is used to show altitude within the thousand foot levels. Both the drum and the pointer rotate continually as the aircraft changes altitude and the mechanism is driven affectively by a barometric capsule. However this instrument is still subject to thousand foot reading errors at altitudes just below the thousand foot levels.

Another instrument which has been developed is the counter pointer altimeter which has a series of counters to show either thousands of feet, thousands and hundreds, or thousands, hundreds and fifties. These counters turn over sharply at the change-over points (e.g. thousand foot levels) and they remain stationary in the interim. A single pointer is used to show altitude within the thousand foot levels. The driving mechanism of this instrument is required to cope with an intermittent loading and the counter change-overs must be sharp. In consequence direct drive by a barometric capsule is unsatisfactory and a servo-mechanism is necessary. Thus although reading errors with this instrument are relatively infrequent the instrument is expensive and intricate.

Another instrument which has been developed is the tape altimeter which contains a long tape with altitudes marked on it at rather large intervals. The tape is moved vertically behind a window with a horizontal lubber line across it. Although reading errors with this instrument should be very infrequent the instrument tends to confuse at anything beyond a small vertical speed because of the consequent rapid movement of the tape. Also the instrument requires considerable power for the large movements of the tape and therefore a servo-mechanism controlled by a pressure capsule is necessary.

The primary object of this invention is to provide for the production of a direct reading instrument such as an altimeter in which the information is presented in digital form, in which the likelihood of a reading error is very slight, and which requires little power for its operation whereby it can be operated directly by a pressure capsule or other means, without necessitating the use of a servo-mechanism. The invention is broadly characterized by the provision of an indicating member having digital markings thereon, and a screening member having a window through which the markings on the indicating member can be viewed, said members being geared together so that movement of the indicating member is accompanied by movement of the screening member, the window in the screening member being so arranged as to retain one digital marking in view in a predetermined cycle and thereafter to present successive digital markings in view in further cycles.

More particularly, the indicating member may comprise a drum having the digital markings on its peripheral surface and the screening member may comprise a disc disposed to rotate about an axis at right angles to the axis of the drum and displaced laterally therefrom, the window being of a spiral formation.

Figures 2, 3:
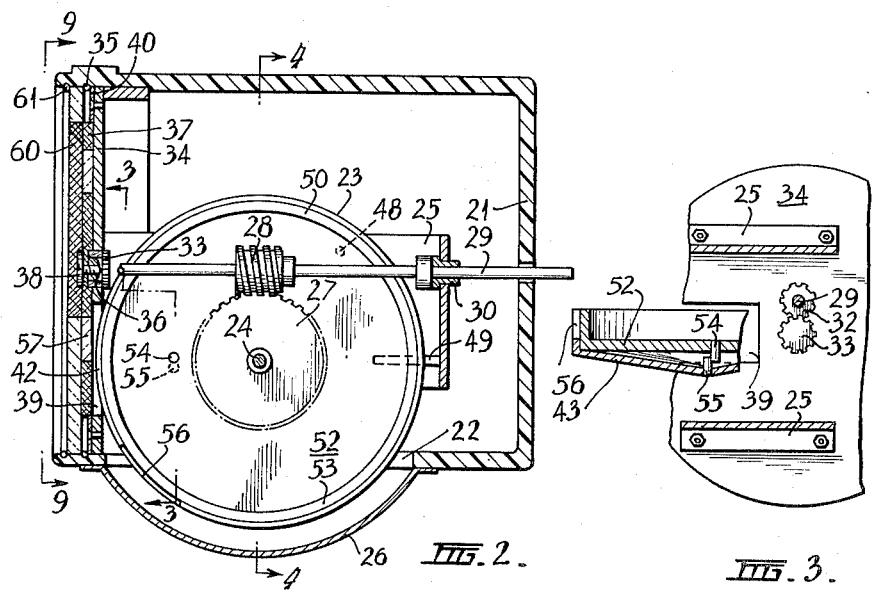
Figures 4, 5:
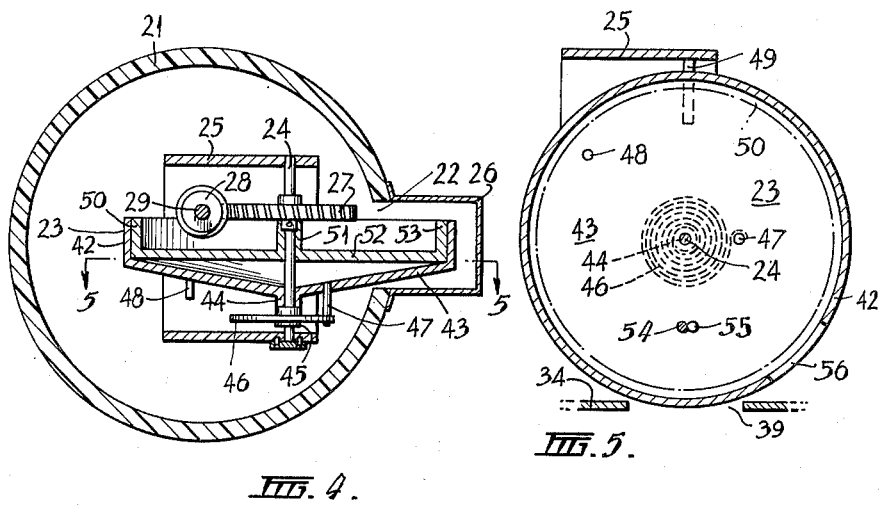
Figure 6:
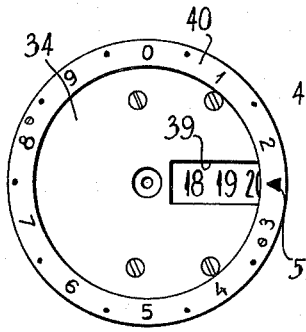
Figure 7:
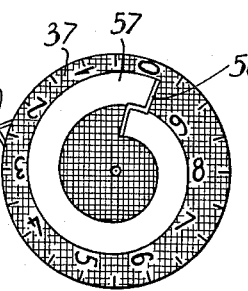
Figure 8:
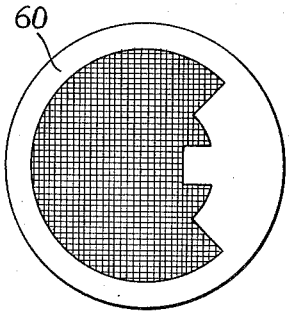
Figure 9:
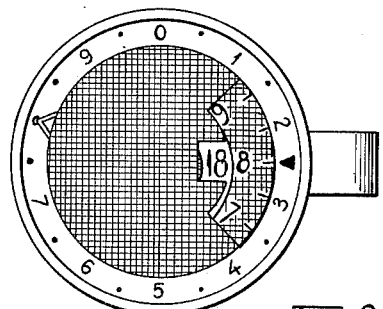

Other features will be apparent from the following description of a preferred form of the invention. In this description reference is made to the accompanying drawings in which :

FIGURE 1 is a perspective view of an aircraft altimeter dial mechanism according to the invention;
FIGURE 2 is a view in section on the line 2—2 of FIGURE 1;
FIGURE 3 is a view in section on line 3—3 of FIGURE 2;
FIGURE 4 is a view in section on line 4—4 of FIGURE 2;
FIGURE 5 is a view in section on line 5—5 of FIGURE 4;
FIGURE 6 is a front view of the face plate of the altimeter;
FIGURE 7 is a front view of the disc which overlies the face plate;
FIGURE 8 is a front view of the mask which overlies the disc and face plate;
FIGURE 9 is a front view of the altimeter on the line 9—9 of FIGURE 2; and
FIGURES 10 to 14 are views similar to FIGURE 9 illustrating the readings illustrated by the altimeter in passing through a thousand foot level of altitude.

The drawings illustrate an altimeter dial mechnism comprising a casing 21 of cylindrical form, cut away at 22 and housing a drum 23. The drum 23 is mounted on a spindle 24 which is supported by bearings in a U-shaped bracket 25 fixed within the casing 21 so that the drum and spindle are able to rotate about the spindle axis, which is vertical when the aircraft fitted with the altimeter is in level horizontal flight. The drum protrudes through the gap 22 in the wall of the casing 21 and is protected by a segment-shaped cover 26 fastened to the wall of the casing.

The spindle 24 has mounted on it also a worm-wheel 27 which is in mesh with a worm 28 fixed on a shaft 29. The shaft 29 is parallel to the axis of the casing 21, but is displaced from said axis in a direction parallel to the direction of the axis of the spindle 24. The shaft 29 is supported by a bearing 30 in the bracket 25 and is driven by the input from a pressure capsule stack 31 so as to rotate in response to changes of altitude. The end of the shaft 29 has fixed to it a cog 32 which is in mesh with a similar cog 33. The cog 33 is coaxial with the casing 21 and with a face plate 34 which is fixed at the front of the casing and held by a split ring 35. The cog 33 is provided with an integral shank 36 which is inserted through a bearing in the centre of the face plate 34, and a disc 37 which overlies the face plate 34 is fixed to the cog shank 36, and constrained to rotate with it by a screw 38 inserted in a screw-threaded cavity in the shank 36.

As best shown in FIGURE 6 the face plate 34 has a rectangular opening 39, which extends radially to the right of the centre in the normal position of viewing, i.e. in the three o'clock position. The opening 39 overlies the drum 23 so that a portion of the peripheral surface of the drum is visible through the opening. The face plate 34 has fixed to it a ring 40, which is marked with the numerals one to nine and zero, at 36° intervals, providing an altitude scale of hundreds of feet, the zero mark being at the 12 o'clock position and the scale reading clockwise. The disc 37 has a pointer 41 fixed on its periphery so as to range over the scale on the ring 40 as the disc rotates with rotation of the shaft 29.

As shown in FIGURE 4 the drum 23 comprises a cylindrical flange portion 42 which is visible in part through the opening 39 in the face plate 34, and an integral shallow conical disc 43 and boss 44. The boss 44 is freely journalled on the spindle 24 and is supported on a collar 45 fixed on the spindle. The collar 45 is fixed to the inner end of a spiral spring 46, and the outer end of this spring is connected to a pin 47 fixed to the disc 43. A second pin 48 is fixed to the disc 43 in a position to engage against a projection 49 extending inwardly from the bracket 25 into the path of movement of the pin 48.

The spindle 24 also carries an inner drum 50 comprising a boss 51 fixed to the spindle, and an integral disc 52 and cylindrical flange portion 53 fitting neatly within the flange portion 42 of the outer drum 23. A pin 54 is fixed to the disc 52 and projects downwardly therefrom into the path of movement of a further pin 55 fixed to the disc 43 and projecting upwardly therefrom. The flange portion 42 of the outer drum 23 is provided with a gap at 56 which is arranged to underly the opening 39 in the face plate 34 when the pin 48 is in engagement with the projection 49.

When the pin 48 is not in engagement with the projection 49 the spring 46 urges the outer drum 23 in a clockwise direction (as viewed in FIGURES 2 and 5) relative to the inner drum 50 so that the pins 54 and 55 are held in engagement as the two drums rotate as a unit with the spindle 24. However after the spindle has been rotated in the clockwise direction a sufficient amount to bring the pin 48 against the projection 49, and is turned a further amount, the outer drum is held stationary while the inner drum continues to turn with the spindle, and the pin 54 moves away from the pin 55. Turning of the spindle may be continued until the pin 54 engages the pin 55 from the opposite side to that shown in FIGURE 5, whereupon the mechanism will be locked against further movement in the same direction. When the spindle 24 is turned in the reverse direction from this extreme position the inner drum turns with it, but the outer drum remains stationary until the pin 54 engages the pin 55 again in the position shown in FIGURE 5. Thereupon as the turning of the spindle is continued the drums continue to turn with it until the pin 48 is brought against the right hand side of the projection 49 (as viewed in FIGURE 5), at which stage the mechanism will again be locked. Thus almost two complete revolutions of the spindle are possible.

The outer surface of the flange 42 of the outer drum 23 is marked with a linear scale of digital markings representing thousands of feet of altitude. The lower end of the scale is immediately anti-clockwise of the gap 56 in the flange 42 and the spacing between the digital markings is fixed in relation to the ratio of the worm 28 and worm-wheel 27, so that the drum flange 42 turns through a distance equal to the space between each successive pair of digital markings for each complete revolution of the shaft 29. The scale of digital markings is continued from the flange 42 onto the flange 53 of the inner drum 50, the scale reading in a continuous fashion from the one drum to the other when they are in the relative positions shown in FIGURE 5, and the angular spacing of the scale markings on the drum 50 being the same as that of those on the outer drum 23.

The disc 37, which is shown in face view in FIGURE 7 and in section in FIGURE 2, is circular in outline and fits within the ring 40 with the pointer 41 overlying the latter. The disc is opaque except for a window 57 which extends completely around it. The border of the window 57 is defined by an Archimedean spiral described about the centre of the disc and extending around it for slightly more than two complete turns. The window is thus of a spiral formation having a constant width, with its inner and outer ends slightly overlapped. At this zone, the border of the window is completed by two straight lines which extend parallel to each other and to the radius of the disc equidistant from them, the two lines meeting the central part of the spiral line. A distinctive cranked marking 58 contrasting with the appearance of the disc 37 is provided extending along these two lines and along a third line at right angles to them and joining their ends.

The disc 37 is marked with a further scale of the integers one to nine and zero, in figures matching those on the drum 23 in appearance, but smaller in size, representing hundreds of feet. These further figures are marked on the face of the disc directly outside the window 57, all being oriented so that they appear erect at the three o'clock position, zero being in radial alignment with the centre of the cranked marking 58 and the others being evenly spaced in order proceeding anti-clockwise around the disc. A pointer 59 directing attention to the scale marking of the disc is marked on the ring 40 in the three o'clock position, that is midway between the integers two and three on the scale on the ring.

It will be noted that in addition to the integers of the scale on the ring 40, and the disc 37 there are intermediate markings representing the intermediate fifty foot levels.

The meter further includes a mask or overlap 60 which is shown in face view in FIGURE 8, and in section in FIGURE 2. It is held in position by a split ring 61 and comprises a disc which is opaque except for an outer annular portion overlying the ring 40, a rectangular portion which overlies the opening 39 in the face plate 34, and portions extending arcuately above and below the latter portion to expose two or three digits of the scale on the disc 37.

Figure 10:
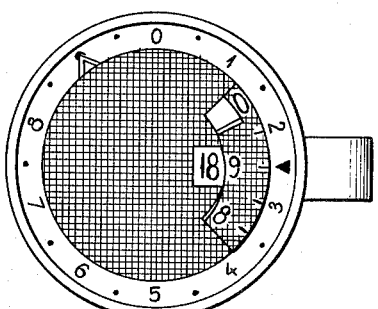
Figure 11:
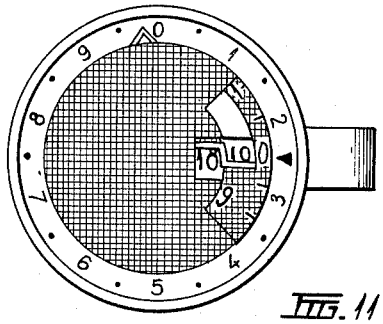
Figure 12:
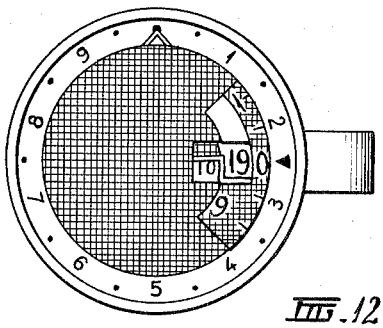
Figure 13:
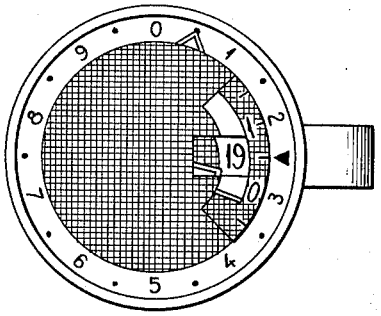
Figure 14:
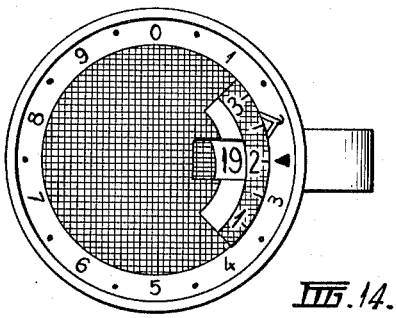

In the operation of the altimeter, as the aircraft is ascending the operation of the pressure capsule stack 31 causes the shaft 29 to turn anti-clockwise, as viewed in FIGURE 4, so that the disc 37 is caused to turn clockwise as viewed in FIGURE 7, and the spindle 24 is caused to turn at a very much slower rate in the clockwise direction as viewed in FIGURES 2 and 5 whereby the markings on the scale of the outer drum 23 or the inner drum 50 visible through the mask 60 and the opening 39, move to the left as viewed in FIGURE 6. Now the only part of the scale on the drum 23 or drum 50 visible through the opening 39 and mask 60 is that which is within the bounds of the window 57 of the disc 37, and since the gear ratio between the disc 37 and the drum spindle 24 is such that the disc moves one revolution while the drum scale moves through the interval of one of its markings, it follows that one digital marking of the drums appears through the opening 39, window 57 and mask 60 during the greater part of a rotation of the disc until the overlapping portion of the window appears over the drums whereupon the next digital marking is visible and it remains centrally in view through the opening, window and mask until the overlapping portion again comes over the drums. FIGURES 9, 10 and 11 show the appearance of the face of the altimeter at altitudes of 18,800 feet, 18,900 feet and about 18,980 feet respectively, and indicate how the digital marking "18" on the drum 23 remains centrally in view while the disc 37 has turned through almost 60°. FIGURES 12, 13 and 14 show the appearance of the face of the altimeter at altitudes of 10,000 feet, 19,050 feet and 19,200 feet respectively, and indicate how the digital marking "19" on the drum 23 remains centrally in view while the disc 37 has turned through a further angle of 60°.

As indicated by FIGURES 9 to 14 inclusive the integers marked on the disc 37 are carried in sequence past the digital marking visible on the drum 23 or inner drum 50 so that each in turn is associated with the latter marking to give a direct reading of the altitude. The mask 60 prevents any more than two or three of the integers on the disc 37 from being seen at the one time and assists in concentrating attention on the relevant markings. When there is no integer of the disc scale directly opposite the drum marking and the pointer 59 the appropriate reading is readily observed without any involved mental process. Thus the fact that the integer "8" in FIGURE 9 is directly in line with the drum marking "18" shows that the correct altitude reading is 18,800 feet, whereas if the integer "8" was a little above or below the line of the marking "18" and the pointer 59 it would immediately be apparent that the altitude was respectively below or above the figure of 18,800.

As the aircraft carrying the altimeter passes through a thousand foot level which for the purposes of illustration in FIGURES 9 to 14 is the 19,000 foot level, the contrasting cranked marking 58 serves to assist the person reading the altimeter to avoid making an error of misreading the thousand foot digits. Thus FIGURE 9 shows the appearance at 18,800 feet when the only marking visible on the drum is the marking "18" and the lines of the cranked marking 58 are entirely obscured by the mask. By the time the altitude has increased to 18,900 the radially outer part of the cranked marking 58 has come into view, but the marking "19" on the drum is still obscured. The marking 58 continues to move downwardly as the altitude is increased and at the level of 18,980 feet, as shown in FIGURE 11 the radially outer part of the marking has moved a sufficient distance to reveal part of the marking "19" while virtually all the marking "18" is still in view. By the time the 19,000 feet level is reached, as shown in FIGURE 12, the marking "19" is in full view above the radially outer part of the cranked marking 58, whereas the radially inner part of the marking 58 has commenced to strike out the marking "18" on the drum. The intermediate portion of the cranked marking 58 has the effect of associating the integer "9" on the disc 37 with the marking "18" and the zero mark on the disc 37 with the marking "19" when the disc is in the vicinity of the positions shown in FIGURES 11 and 12, making it well-nigh impossible to misread by an amount of one thousand feet.

FIGURE 13 shows the appearance by the time an altitude of 19,050 feet has been used. Here, the digital marking "18" has been completely obscured by the disc 37 although all the cranked marking 58 is still visible. FIGURE 14 shows the appearance corresponding to an altitude of 19,200 feet at which the cranked marking 58 has been completely obscured by the opaque portion of the mask 60.

The integers and other marking on the disc 37 including the cranked marking 58, provide with the digital markings on the drums 23 and 50 a very suitable means for check reading the altitude particularly as they enable the pilot of an aircraft to read the altitude to the nearest hundred feet without looking beyond the three o'clock position on the face of the instrument. The same means may be made use of for tracking up or down to a desired altitude although for the latter purpose it is preferable to go by the digital markings on the drum in conjunction with the pointer 41 of the disc 37 moving over the scale on the ring 40. The digits of the scale on the ring 40 are preferably smaller than those on the disc 37 and are oriented radially rather than vertically to avoid confusion.

Although the invention is particularly applicable to aircraft altimeters it may be applied with advantage to other instruments in which direct digital reading of a variable quantity is desired.

We claim:
1. A digital indicating device comprising
a face plate having an elongated opening therein;
an indicating member mounted rearwardly of said face plate;
said indicating member bearing digital markings extending in ordered sequence at spaced intervals along part of the surface thereof;
means for moving said indicating member in response to variation in the value of a quantity to be indicated to cause said part of said surface bearing said digital markings to travel behind said elongated opening in the direction of the elongation thereof;
a screening member overlying said face plate;
said screening member bearing a set of digital markings denoting fractional parts of the increment between the values of adjacent digital markings on said indicating member;
said screening member having a window extending beside said digital markings thereon and enabling a digital marking on said indicating member and a digital marking on said screening member to combine to display a composite number;
means for moving said screening member at a speed which is directly proportional to the speed of movement of said indicating member to cause said digital markings on said screening member and said window to move relative to said elongated opening in a direction substantially at right angles to the direction of elongation thereof;
the ratio of the speed of movement of said screening member to the speed of movement of said indicating member being equal to the ratio of the distance occupied by said set of digital markings on said screening member equivalent to the said increment and the distance between two adjacent markings on said indicating member; and
the boundaries of said window being inclined so as to produce a movement thereof relative to said opening in said face plate corresponding to the movement of said indicating member relative to said opening.

2. A digital indicating device comprising
a face plate having an elongated opening therein;
an indicating member mounted rearwardly of said face plate;
said indicating member bearing digital markings extending in ordered sequence at spaced intervals along part of the surface thereof;
means for moving said indicating member in response to variation in the value of a quantity to be indicated to cause said part of said surface bearing said digital markings to travel behind said elongated opening in the direction of the elongation thereof;
a rotary disc overlying said face plate;
said disc bearing a set of digital markings denoting fractional parts of the increment between the values of adjacent digital markings on said indicating member;
said digital markings on said disc being evenly spaced and extending in a complete circle thereon;
said disc having a window extending beside said digital markings thereon and enabling a digital marking on said indicating member and a digital marking on said disc to combine to display a composite number;
means for turning said disc at a speed which is directly proportional to the speed of said indicating member to cause said digital markings of said disc and said window thereof to move in a direction substantially at right angles to the direction of elongation of said elongated opening;
said disc being geared to turn through one complete circle while the indicating member moves through the distance between two adjacent digital markings thereon; and
said window being of spiral formation and having a constant width equal to the distance between two adjacent digital markings on said indicating member and having its end portions slightly overlapping each other.

3. A digital indicating device comprising
a face plate having an elongated opening therein;

a rotary indicating drum mounted rearwardly of said face plate behind said opening therein on an axis parallel to the plane of said face plate and at right angles to the direction of elongation of said opening;

said indicating drum bearing digital markings extending in ordered sequence at spaced intervals along its peripheral surface;

means for rotating said drum in response to variation in the value of a quantity to be indicated;

a disc overlying said face plate;

said disc having a window defined by an Archimedean spiral described about the centre of rotation of said disc and extending slightly more than two turns, the spacing between adjacent turns of said spiral being equal to the distance between adjacent digital markings on said drum;

said window enabling the digital markings on said drum to be viewed through said opening in said face plate;

said disc bearing digital markings extending in a complete ring beside said window and denoting fractional parts of the increment between the values of adjacent digital markings on said drum with the zero mark adjacent to the outer end of said spiral; and means for driving said disc and said drum, the angular speed of said disc being equal to the angular speed of said drum divided by the angular distance between two adjacent digital markings on said drum measured in degrees and multiplied by three hundred and sixty.

4. A digital indicating device as defined in claim 1 in which said face plate is provided with a peripheral ring bearing digital markings and said screening member is provided with a pointer overlying said ring.

5. A digital indicating device as defined in claim 4 comprising a mask overlying said screening member, said mask having an annular transparent area overlying said ring on said face plate, a rectangular transparent area overlying at least a portion of said elongated opening in said face plate and an arcuate transparent area overlying at least a part of said set of digital markings on said screening member.

6. A digital indicating device as defined in claim 2 in which the overlapping end portions of said spiral window are outlined by a crank shaped marking extending across the ends of the spiral and between the overlapped end portions thereof.

7. A digital indicating device comprising a casing, a drive shaft rotatably mounted in said casing, a face plate on said casing, said face plate having an elongated opening extending horizontally to the right of the center of said face plate when said device is viewed normally, a spindle rotatably mounted in said casing rearwardly of said opening, reduction gearing connecting said drive shaft with said spindle, a drum mounted on said spindle for rotation therewith, digital markings on said drum that are visible through said opening, a disc overlying said face plate, drive means connecting said drive shaft to said disc, the ratio of said drive means to said reduction gearing being such that said disc will rotate one complete revolution while said drum rotates only the angular distance between adjacent digital markings thereon, said disc having a window defined by an Archimedean spiral inscribed about the center of rotation of said disc and extending slightly more than two turns, said window overlying said opening and being of such width as to expose only one digital marking, the sense of said spirial being such that one digital marking remains in view through said window and said opening for substantially one complete revolution of said disc.

8. A digital indicating device as defined in claim 7 in which said disc has a set of digital markings thereon adjacent to said window.

References Cited by the Examiner

UNITED STATES PATENTS

| | | | |
|---|---|---|---|
| 2,238,718 | 4/41 | De Florez et al. | 116—129 |
| 2,458,022 | 1/49 | Phelps et al. | 116—129 |
| 2,765,764 | 10/56 | Beldt | 116—129 |
| 3,001,503 | 9/61 | Hezel | 116—129 |
| 3,115,863 | 12/63 | Kurowski | 116—129 |

LOUIS J. CAPOZI, *Primary Examiner.*